United States Patent
Luo et al.

(10) Patent No.: US 8,477,705 B2
(45) Date of Patent: Jul. 2, 2013

(54) EFFICIENT CONTROL CHANNEL DECODING IN COMP COMMUNICATIONS

(75) Inventors: Tao Luo, San Diego, CA (US); Durga Prasad Malladi, San Diego, CA (US); Xiaoxia Zhang, San Diego, CA (US); Yongbin Wei, San Diego, CA (US); Juan Montojo, San Diego, CA (US); Ke Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 12/846,586

(22) Filed: Jul. 29, 2010

(65) Prior Publication Data

US 2011/0038329 A1     Feb. 17, 2011

Related U.S. Application Data

(60) Provisional application No. 61/230,077, filed on Jul. 30, 2009.

(51) Int. Cl.
*H04W 4/00* (2009.01)

(52) U.S. Cl.
USPC .............. 370/329; 455/450; 714/748

(58) Field of Classification Search
None
See application file for complete search history.

(56) References Cited

U.S. PATENT DOCUMENTS

| | | | |
|---|---|---|---|
| 2011/0317637 A1* | 12/2011 | Kim et al. | 370/329 |
| 2012/0002643 A1* | 1/2012 | Chung et al. | 370/331 |
| 2012/0039291 A1* | 2/2012 | Kwon et al. | 370/329 |
| 2012/0082058 A1* | 4/2012 | Gerstenberger et al. | 370/252 |
| 2012/0147815 A1* | 6/2012 | Meyer et al. | 370/328 |

OTHER PUBLICATIONS

Panasonic, "Discussion on PUCCH coordination for UL CoMP", Mar. 2009, 3gPP TSGG RAN WG1 Meeting #56bis, pp. 1-3.*
Fujitsu: "Discussion on DL coordinated multipoint transmission" 3GPP Draft TSG-RAN1 #54; R1-083115, Jeju, Korea, (Aug. 18-22, 2008), XP050316556, p. 4, paragraph 2.
International Search Report and Written Opinion—PCT/US2010/044023, International Search Authority—European Patent Office—Dec. 28, 2010.
Panasonic: "Comparison of Orthogonal/Non-orthogonal CoMP transmission for PUCCH", 3GPP Draft; R1-092529, 3rd Generation Partnership Project (3GPP), Mobile Competence Centre ; 650, Route Des Lucioles ; F-06921 Sophia-Antipolis Cedex ; France, No. Los Angeles, USA; 20090623, Jun. 23, 2009, XP050351034, [retrieved on Jun. 23, 2009].
Panasonic: "Discussion on PUCCH coordination for UL CoMP", 3GPP Draft; R1-091165, 3rd Generation Partnership Project (3GPP), Mobile Competence Centre ; 650, Route Des Lucioles ; F-06921 Sophia-Antipolis Cedex ; France, No. Seoul, Korea; 20090317, Mar. 17, 2009, XP050338786, [retrieved on Mar. 17, 2009].
Qualcomm Europe: "Coordinated Multi-Point downlink transmission in LTE-Advanced" 3GPP Draft; R1-084400 Comp, 3rd Generation Partnership Project (3GPP), Mobile Competence Centre ; 650, Route Des Lucioles ; F-06921 Sophia-Antipolis Cedex; France, No. Prague, Czwh Republic; 20081105, Nov. 5, 2008, XP050317663.

(Continued)

*Primary Examiner* — Chi Pham
*Assistant Examiner* — Mohammad Adhami

(57) ABSTRACT

Certain embodiments of the present disclosure propose two efficient designs for a control channel in a Coordinated Multi-Point (CoMP) system. The proposed designs enable a user equipment (UE) to transmit acknowledgement (ACK) and negative acknowledgement (NACK) signals to one or more access points (APs) upon receiving transmissions from them.

48 Claims, 6 Drawing Sheets

OTHER PUBLICATIONS

Qualcomm Europe: "TP for feedback in support of DL CoMP for LTEA TR", 3GPP Draft; R1-092290 TP for TR 36.814 on DL Comp Feedback, 3rd Generation Partnership Project (3GPP), Mobile Competence Centre; 650, Route Des Lucioles; F-06921 Sophia-Antipolis Cedex; France, No. San Francisco, USA; 20090609, Jun. 9, 2009, XP050339699, [retrieved on Jun. 9, 2007].

Samsung: "Uplink ACK/NACK resource allocation", 3GPP Draft; R1-071574, 3rd Generation Partnership Project (3GPP), Mobile Competence Centre; 650, Route Des Lucioles; F-06921 Sophia-Antipolis Cedex; France, vol. RAN WGI, No. St. Julian; 20070403, Apr. 3, 2007, XP050105504, [retrieved on Apr. 3, 2007].

Fujitsu, Efficient HARQ Protocol for SIC based DL CoMP [online], 3GPP TSG-RAN WG1#56b R1-091496, URL: http://www.3gpp.org/ftp/tsg_ran/WG1_RL1/TSGR1_56b/Docs/R1-091496.zip, Mar. 27, 2009.

LG Electronics Inc., CoMP scheduling considering different types of relay nodes[online], 3GPP TSG-RAN WG1#56b R1-091190, URL:http://www.3gpp.org/ftp/tsg ran/WG1_RL1/TSGR1_56b/Docs/R1-091190.zip, Mar. 27, 2009.

ZTE, Control Signaling Structures for Relay Link [online], 3GPP TSG-RAN WG1#56 R1-090641, URL: http://www.3gpp.org/ftp/tsg_ran/WG1_RL1/TSGR1_56/Docs/R1-090641.zip, Feb. 13, 2009.

* cited by examiner

EFFICIENT CONTROL CHANNEL DECODING IN COMP COMMUNICATIONS

CLAIM OF PRIORITY UNDER 35 U.S.C. §119

The present application for patent claims benefit of U.S. Provisional Patent Application Ser. No. 61/230,077, entitled, "Efficient Control Channel Decoding In CoMP Communications," filed Jul. 30, 2009, and assigned to the assignee hereof and hereby expressly incorporated by reference herein.

TECHNICAL FIELD

The present disclosure generally relates to communication, and more specifically to efficient decoding of uplink control channel in a wireless communication network.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output, multiple-input-single-output or a multiple-input-multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

SUMMARY

Certain aspects of the present disclosure provide a method for wireless communications by a non-serving access point (AP) of a coordinated multi-point (CoMP) set. The method generally includes receiving, from a serving access point (AP) of the CoMP set, information regarding uplink resources allocated to a first user equipment (UE) for acknowledgement of a joint CoMP transmission sent from a plurality of APs in the CoMP set, sending a downlink transmission to the first UE as part of the joint CoMP transmission, and taking one or more actions, based on the information received from the serving AP, to reduce interference with the acknowledgement of the joint CoMP transmission from the first UE.

Certain aspects of the present disclosure provide a method for wireless communications by a serving access point (AP) of a coordinated multi-point (CoMP) set. The method generally includes transmitting, to a non-serving access point (AP) of the CoMP set, information regarding uplink resources allocated to a user equipment (UE) for acknowledgement of a joint CoMP transmission sent from a plurality of APs in the CoMP set, and transmitting a downlink transmission to the UE as part of the joint CoMP transmission.

Certain aspects of the present disclosure provide an apparatus for wireless communications by a non-serving access point (AP) of a coordinated multi-point (CoMP) set. The apparatus generally includes at least one processor configured to receive, from a serving access point (AP) of the CoMP set, information regarding uplink resources allocated to a first user equipment (UE) for acknowledgement of a joint CoMP transmission sent from a plurality of APs in the CoMP set, send a downlink transmission to the first UE as part of the joint CoMP transmission, and take one or more actions, based on the information received from the serving AP, to reduce interference with the acknowledgement of the joint CoMP transmission from the first UE, and a memory coupled to the at least one processor.

Certain aspects of the present disclosure provide an apparatus for wireless communications by a serving access point (AP) of a coordinated multi-point (CoMP) set. The apparatus generally includes at least one processor configured to transmit, to a non-serving access point (AP) of the CoMP set, information regarding uplink resources allocated to a user equipment (UE) for acknowledgement of a joint CoMP transmission sent from a plurality of APs in the CoMP set, and to transmit a downlink transmission to the UE as part of the joint CoMP transmission, and a memory coupled to the at least one processor.

Certain aspects of the present disclosure provide an apparatus for wireless communications by a non-serving access point (AP) of a coordinated multi-point (CoMP) set. The apparatus generally includes means for receiving, from a serving access point (AP) of the CoMP set, information regarding uplink resources allocated to a first user equipment (UE) for acknowledgement of a joint CoMP transmission sent from a plurality of APs in the CoMP set, means for sending a downlink transmission to the first UE as part of the joint CoMP transmission, and means for taking one or more actions, based on the information received from the serving AP, to reduce interference with the acknowledgement of the joint CoMP transmission from the first UE.

Certain aspects of the present disclosure provide an apparatus for wireless communications by a serving access point (AP) of a coordinated multi-point (CoMP) set. The apparatus generally includes means for transmitting, to a non-serving access point (AP) of the CoMP set, information regarding uplink resources allocated to a user equipment (UE) for acknowledgement of a joint CoMP transmission sent from a plurality of APs in the CoMP set, and means for transmitting a downlink transmission to the UE as part of the joint CoMP transmission.

Certain embodiments provide a computer-program product for wireless communications by a non-serving access point (AP) of a coordinated multi-point (CoMP) set, comprising a computer readable medium having instructions stored thereon, the instructions being executable by one or more processors. The instructions generally include instructions for receiving, from a serving access point (AP) of the CoMP set, information regarding uplink resources allocated to a first user equipment (UE) for acknowledgement of a joint CoMP transmission sent from a plurality of APs in the CoMP set, instructions for sending a downlink transmission to the first UE as part of the joint CoMP transmission, and instructions for taking one or more actions, based on the information received from the serving AP, to reduce interference with the acknowledgement of the joint CoMP transmission from the first UE.

Certain embodiments provide a computer-program product for wireless communications by a serving access point (AP) of a coordinated multi-point (CoMP) set, comprising a computer readable medium having instructions stored thereon, the instructions being executable by one or more processors. The instructions generally include instructions for transmitting, to a non-serving access point (AP) of the CoMP set, information regarding uplink resources allocated to a user equipment (UE) for acknowledgement of a joint CoMP transmission sent from a plurality of APs in the CoMP set, and instructions for transmitting a downlink transmission to the UE as part of the joint CoMP transmission.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
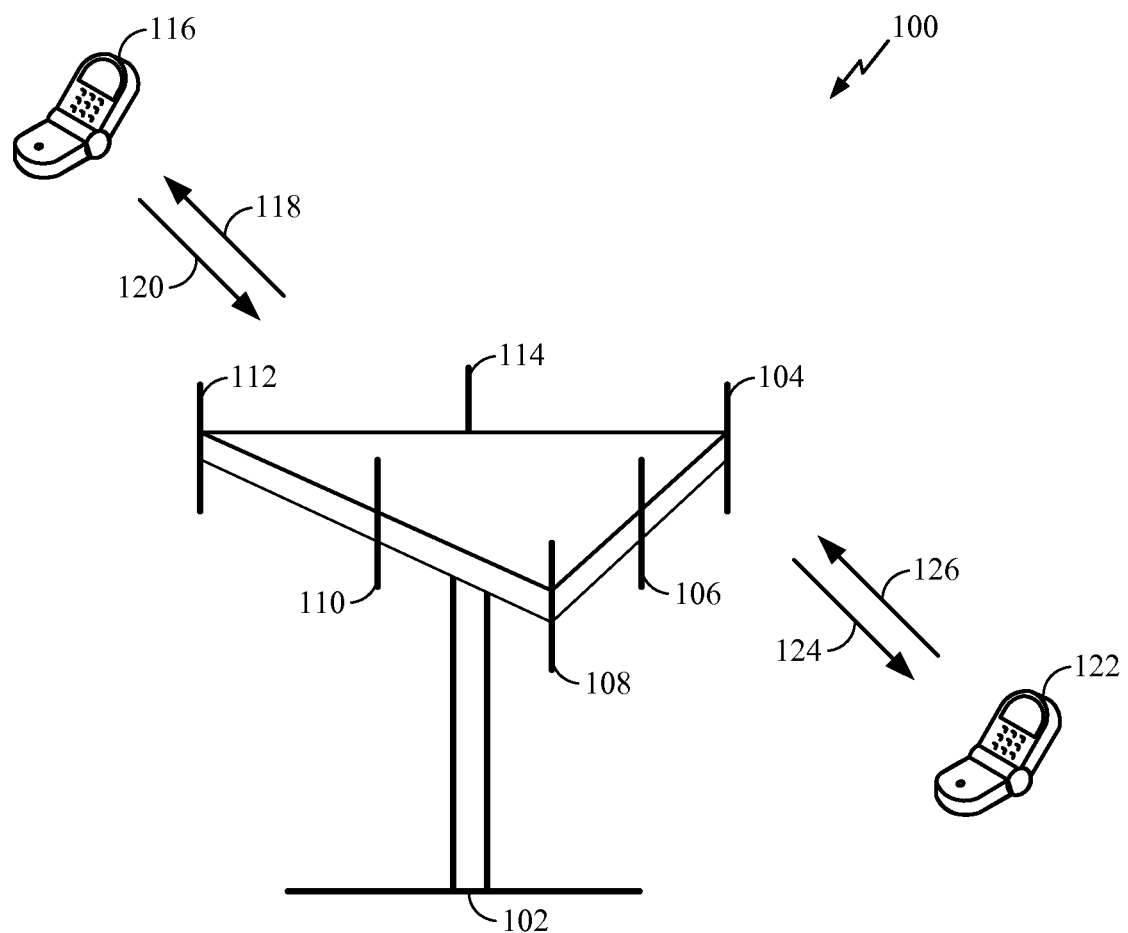
FIG. 1 illustrates a multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project"

(3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

In a coordinated Multi-Point (CoMP) system, two or more access points 100 coordinate their transmissions to an access terminal (i.e., user equipment) 116. The access points may be a serving access point or one or more non-serving access points (i.e., access points that do not serve the AT 116). The APs may communicate with each other through a backhaul network.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
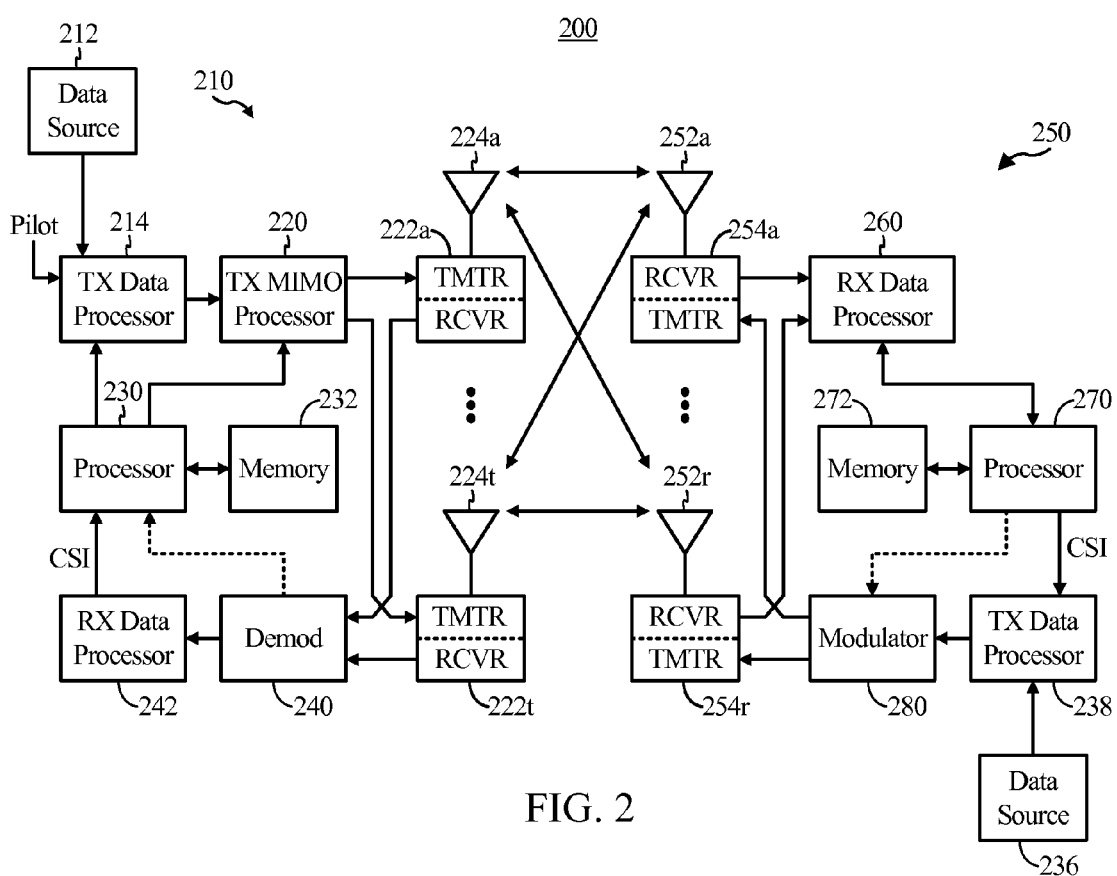
FIG. 2 illustrates a block diagram of a communication system, in accordance with certain aspects of the present disclosure.

FIG. 2 is a block diagram of an embodiment of a transmitter system 210 (also known as the access point) and a receiver system 250 (also known as access terminal) in a MIMO system 200. The transmitter may be a serving access point or a non-serving access point in a CoMP network. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
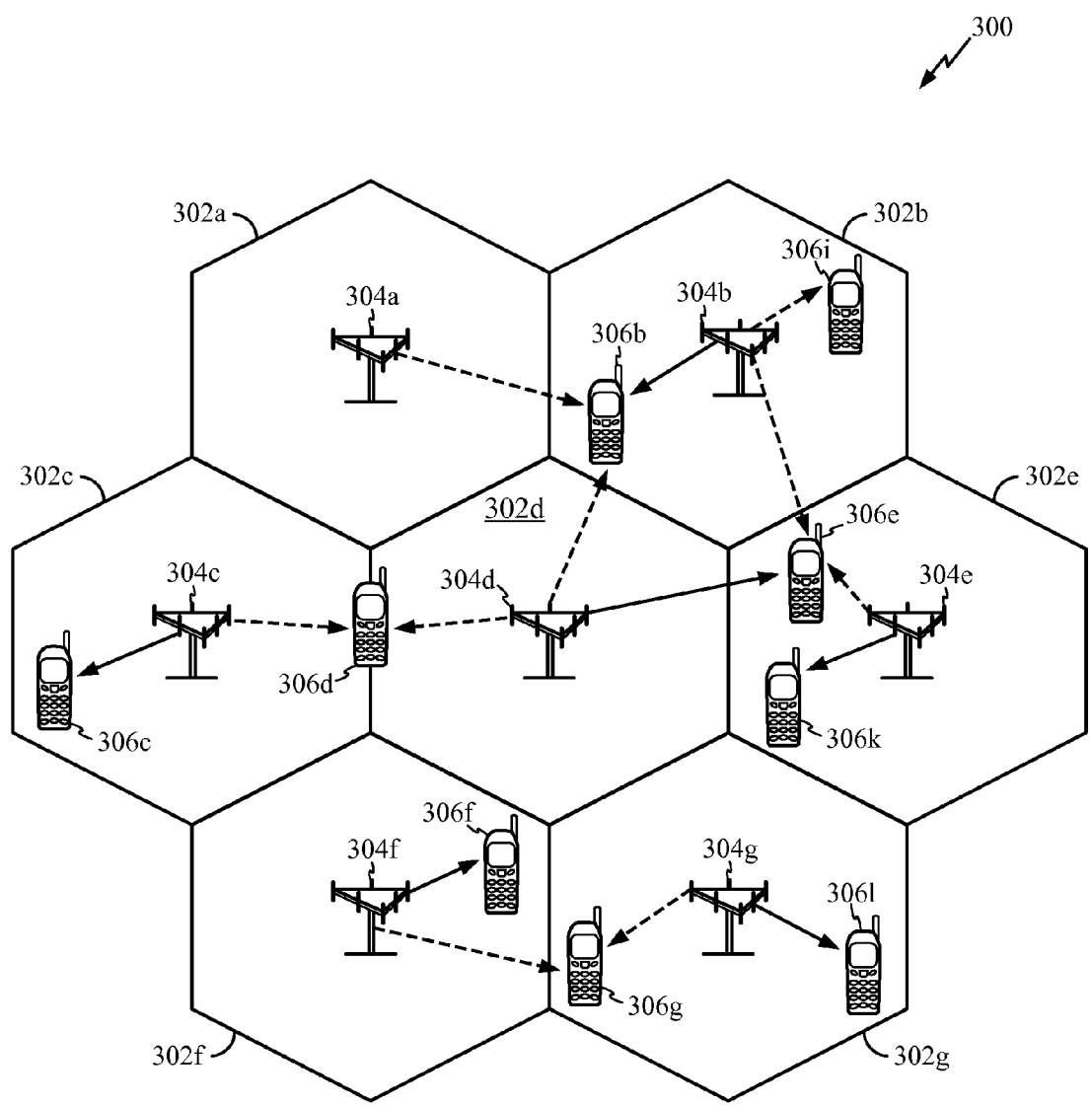
FIG. 3 illustrates an example wireless communication system, in accordance with certain aspects of the present disclosure.

FIG. 3 illustrates an example wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g., to serve one or more frequencies). Various access terminals (ATs) 306, including ATs 306a-306k, also known interchangeably as user equipment (UE) or mobile stations, are dispersed throughout the system.

Each UE 306 may communicate with one or more APs 304 on a forward link (FL) and/or a reverse link (RL) at a given moment, depending upon whether the UE is active and whether it is in soft handoff, for example. The wireless communication system 300 may provide service over a large geographic region, for example, macro cells 302a-302g may cover a few blocks in a neighborhood.

Two or more access points 304 a-g may participate in a CoMP transmission to a UE (i.e., 306b). Uplink transmissions from the UE 306b may interfere with transmissions from another UE (i.e., 306e). For example, the interference might include acknowledgement or negative acknowledgement signals used in hybrid automatic repeat request (HARQ). For certain embodiments, the serving AP (i.e., 304b) of the UE 306b may coordinate use of uplink resources to minimize the interference.

Certain embodiments of the present disclosure propose two efficient designs for a control channel in a Coordinated Multi-Point (CoMP) system. The proposed designs enable a user equipment (UE) to transmit acknowledgement (ACK) and negative acknowledgement (NACK) signals to one or more access points (APs) upon receiving transmissions from them.

According to one embodiment, a downlink CoMP framework includes coordinated transmissions from multiple network nodes (e.g., access points, cells, base stations or evolved node Bs (eNBs)) to one or more UEs that minimize inter-node interference and/or provide channel gain when signals from multiple nodes are combined at the UE receiver. Coordinated transmissions from multiple access points may result in increased throughput of the system, and better signal quality at the UE.

Figure 4:
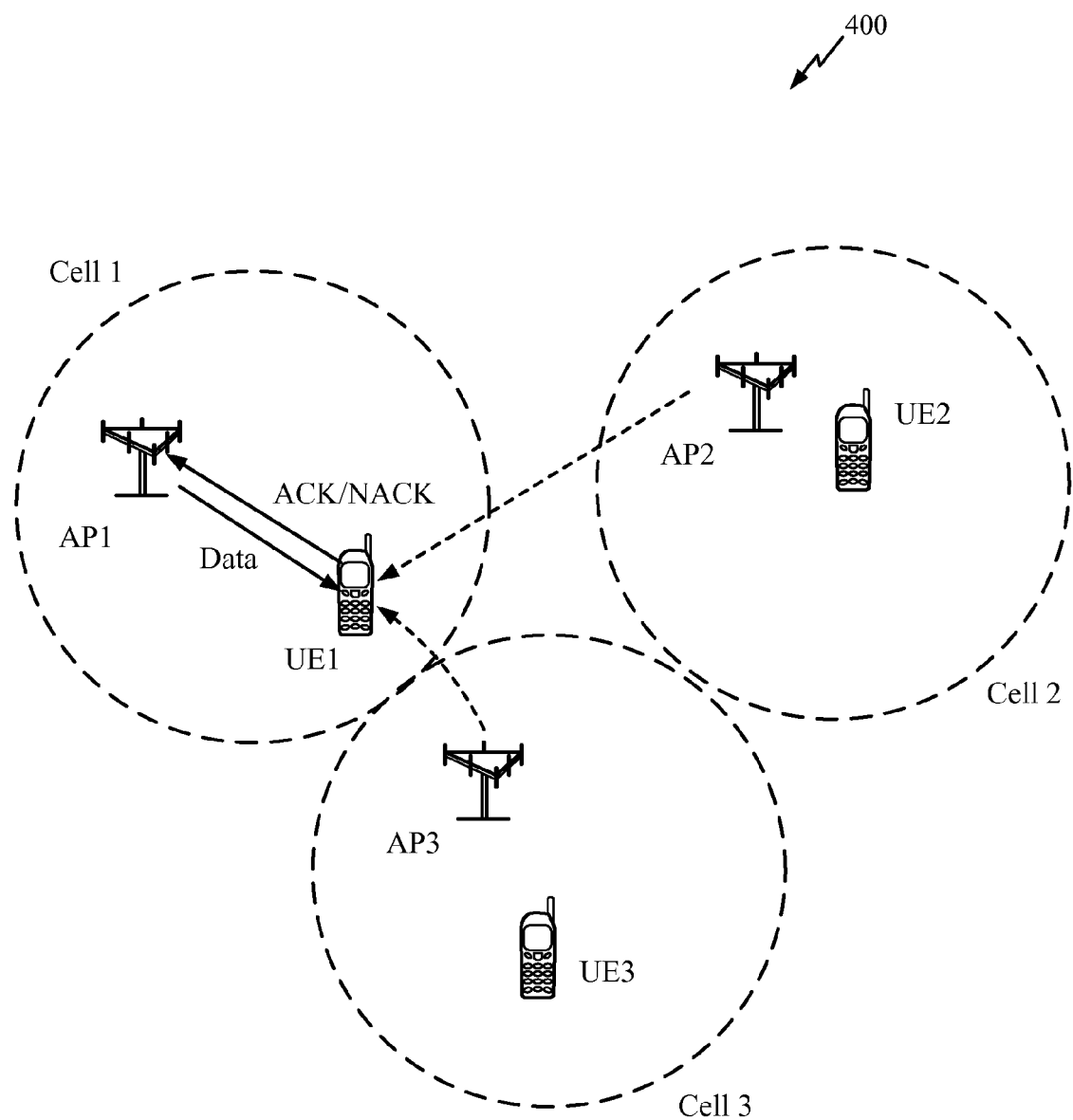
FIG. 4 illustrates an example communication system utilizing coordinated multi-point (CoMP) transmissions, in accordance with certain aspects of the present disclosure.

FIG. 4 illustrates a communication system 400 utilizing CoMP transmissions, in accordance with certain aspects of the present disclosure. As illustrated, access points AP1, AP2 and AP3 serve user equipments UE1, UE2 and UE3, respectively. The access points AP1, AP2 and AP3 belong to a CoMP set for UE1. A CoMP set refers to a collection of access points that transmit to a given UE using CoMP transmissions. Therefore, although UE1 is served with AP1, other access points in the CoMP set may also communicate with UE1.

Non-serving access points AP2 and AP3 may send similar or different data to UE1 than the serving access point AP1. The access points may communicate with other access points in the CoMP set through a backhaul network, over the air, etc. to coordinate transmissions.

In hybrid automatic repeat request (HARQ) operation, when an AP transmits a signal to a UE, the UE sends ACK or NACK signals to the AP. If the AP receives a NACK signal, it re-transmits the same signal to the UE. If HARQ is used for CoMP transmissions, the ACK/NACK signals transmitted to each of the APs may collide with ACK/NACK signals from the other UEs that are served by those APs. Therefore, there is a need for efficient design of the control channel for ACK/NACK transmission to prevent collisions.

For certain embodiments of the present disclosure, APs in a CoMP set may use signaling through the radio resource control (RRC) layer (i.e., Layer 3) to configure PUCCH resources for a UE in coordinated transmission mode. The RRC layer in the AP has different functionalities such as broadcasting system information, making handover decisions, paging for the UEs over the air, controlling UE measurement reporting, etc. By utilizing layer 3 signaling, each of the APs in a CoMP set may be informed of the PUCCH resources utilized in CoMP transmission. The UE may use the PUCCH resources to transmit ACK/NACK signals to the APs. For example, an AP (e.g., a serving AP) may provide information that is used by other APs (e.g., non-serving APs) when they assign resources to their UEs outside of the coordinated transmission.

For certain embodiments, access points other than the serving AP that are participating in coordinated transmission to a UE may coordinate physical uplink control channel (PUCCH) resources such that ACK/NACK signals transmitted by the UE do not collide with any ACK/NACK signals from other UEs associated with those APs. A collision may happen when two or more UEs transmit signals over the same uplink channel simultaneously. To avoid collision, the non-serving APs may avoid assigning the same PUCCH resources that are utilized in the CoMP transmission to other UEs. Therefore, for efficient operation, the APs need to coordinate UL scheduling among members of the CoMP set.

For certain embodiments, APs other than the serving AP may clear PUCCH resources. Such resources may be determined by utilizing the first control channel element (CCE) transmitted in the physical downlink control channel (PDCCH) of the serving AP for this UE. In addition, parameters received through Layer 3 signaling may also be used in determining the PUCCH resources. A non-serving AP may 'clear' PUCCH resources by not scheduling other UEs over the same resources used in CoMP transmissions.

For certain embodiments, CoMP transmission points (e.g., the APs in the CoMP set) may have different HARQ operations. For example, a different set of transmission points may be configured across different transmissions (including new transmissions) based on the CQI feedback received from a UE. Since channels between the UE and the APs in the CoMP set may be different for different transmissions.

For certain embodiments, HARQ may be enabled for the CoMP transmissions from a serving AP and may be disabled for CoMP transmissions from non-serving APs. For example, the HARQ operation may be disabled at a non-serving AP in response to instructions from the serving AP. Therefore, if a UE receives a packet from the serving AP, the UE may respond by transmitting an ACK or a NACK signal through the PUCCH to the serving AP.

For certain embodiment, non-serving APs may treat each downlink CoMP transmission as a one-time event. Therefore, only the serving AP may be responsible for coordinating the retransmissions. The non-serving APs may transmit the same data packet that was transmitted by the serving AP to the UE. Therefore, even if the UE does not receive the packet from one of the non-serving APs, the UE may receive the same packet from the serving AP and other non-serving APs. In order to make sure that all the data packets are received by the UE, the serving AP may be responsible for coordinating the retransmissions.

Figure 5:
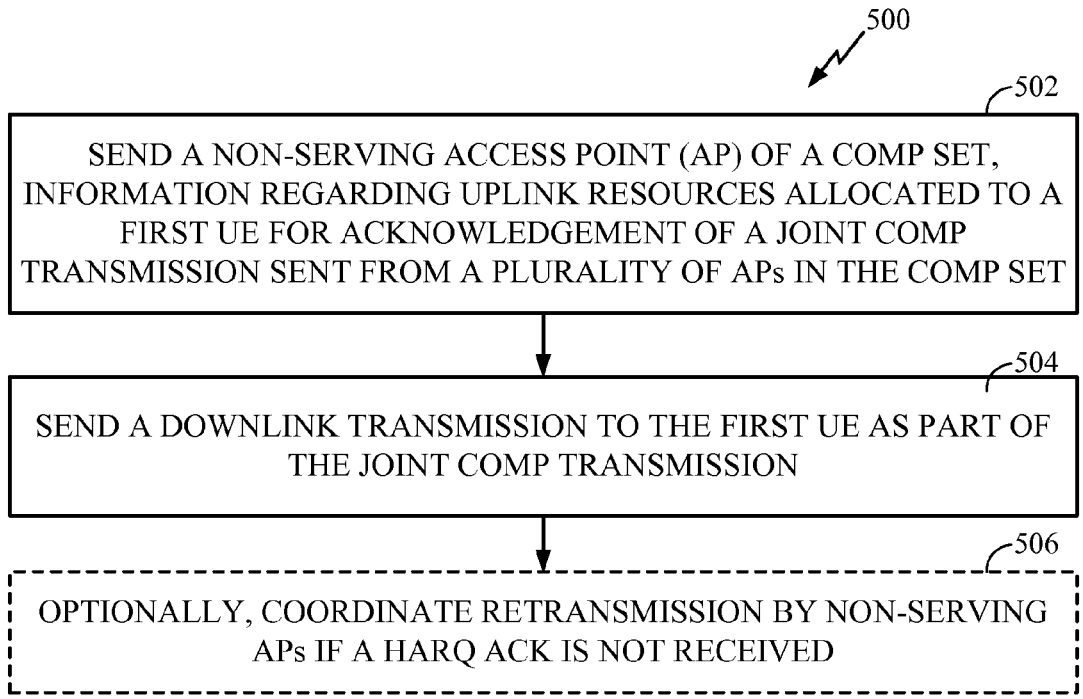
FIG. 5 illustrates example operations that may be performed by a serving access point (AP) of a CoMP set for an efficient decoding of an uplink control channel, in accordance with certain aspects of the present disclosure.

FIG. 5 illustrates example operations 500 that may be performed by a serving AP of a CoMP set for an efficient decoding of an uplink control channel, in accordance with certain aspects of the present disclosure. At 502, the serving AP transmits, to a non-serving AP of the CoMP set, information regarding uplink resources allocated to a UE for acknowledgement of a joint CoMP transmission sent from a plurality of APs in the CoMP set. The serving AP may assign the resources to the UE and communicate the assigned resources to the other APs through a backhaul network. At 504, the serving AP transmits a downlink transmission to the first UE as part of the joint CoMP transmission. At 606, if the downlink transmission is not received by the UE correctly, the serving AP may transmit information regarding the downlink transmission to a non-serving AP and request the non-serving AP to retransmit the downlink transmission.

Figure 6:
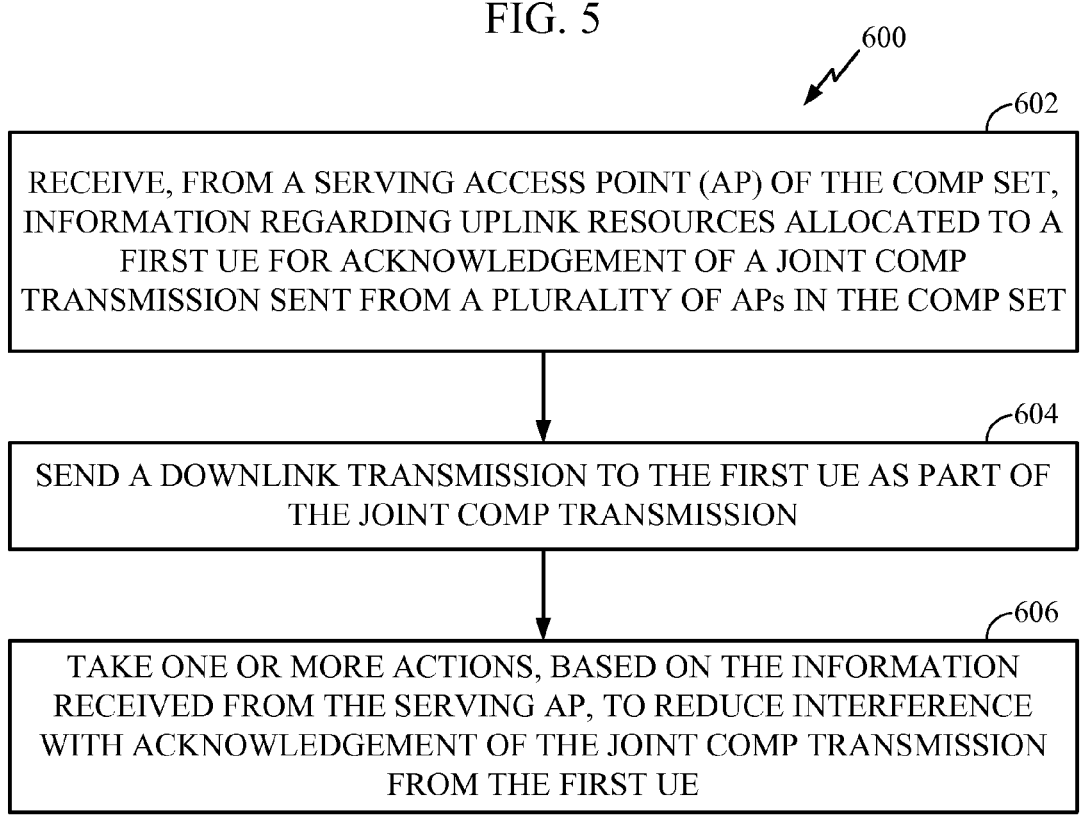
FIG. 6 illustrates example operations that may be performed by a non-serving AP of a CoMP set for an efficient decoding of an uplink control channel, in accordance with certain aspects of the present disclosure.

FIG. 6 illustrates example operations 600 that may be performed by a non-serving AP of a CoMP set for an efficient decoding of an uplink control channel, in accordance with certain aspects of the present disclosure. At 602, the non-serving AP receives from a serving access point (AP) of the CoMP set, information regarding uplink resources allocated to a first UE for acknowledgement of a joint CoMP transmission sent from a plurality of APs in the CoMP set. The information may be received through a backhaul network.

At 604, the non-serving AP sends a downlink transmission to the first UE as part of the joint CoMP transmission. The downlink transmission may include a similar data that is transmitted by the serving AP to the UE.

At 606, the non-serving AP may take one or more actions, based on the information received from the serving AP, to reduce interference with acknowledgement of the joint CoMP transmission from the first UE. The non-serving AP may avoid allocation of uplink resources to one or more second UEs that would potentially interfere with the acknowledgement transmitted from the first UE. For example, the non-serving AP may avoid allocation of uplink resources to the second UEs for transmitting acknowledgements that overlap with the uplink resources allocated to the first UE for transmitting the acknowledgement. Another action taken by the non-serving AP may be sending downlink transmissions to one or more UEs with HARQ disabled. Therefore, if the downlink transmission is not received by the UE correctly, the non-serving AP may receive information regarding retransmission of the downlink transmission from the serving AP.

For example, a serving AP of the CoMP set may instruct a non-serving AP to treat the packet transmission as a one-time event. Therefore, the non-serving AP does not expect to receive an ACK or a NACK message from the UE. If the UE receives the packet correctly, it will process the packet with other copies of the packet that has received from the serving AP and other APs in the CoMP set. If the UE does not receive the packet correctly, the UE may ignore the packet, may only process other copies of the packet that are received from the serving AP and possibly other APs in the CoMP set.

Figure 7:
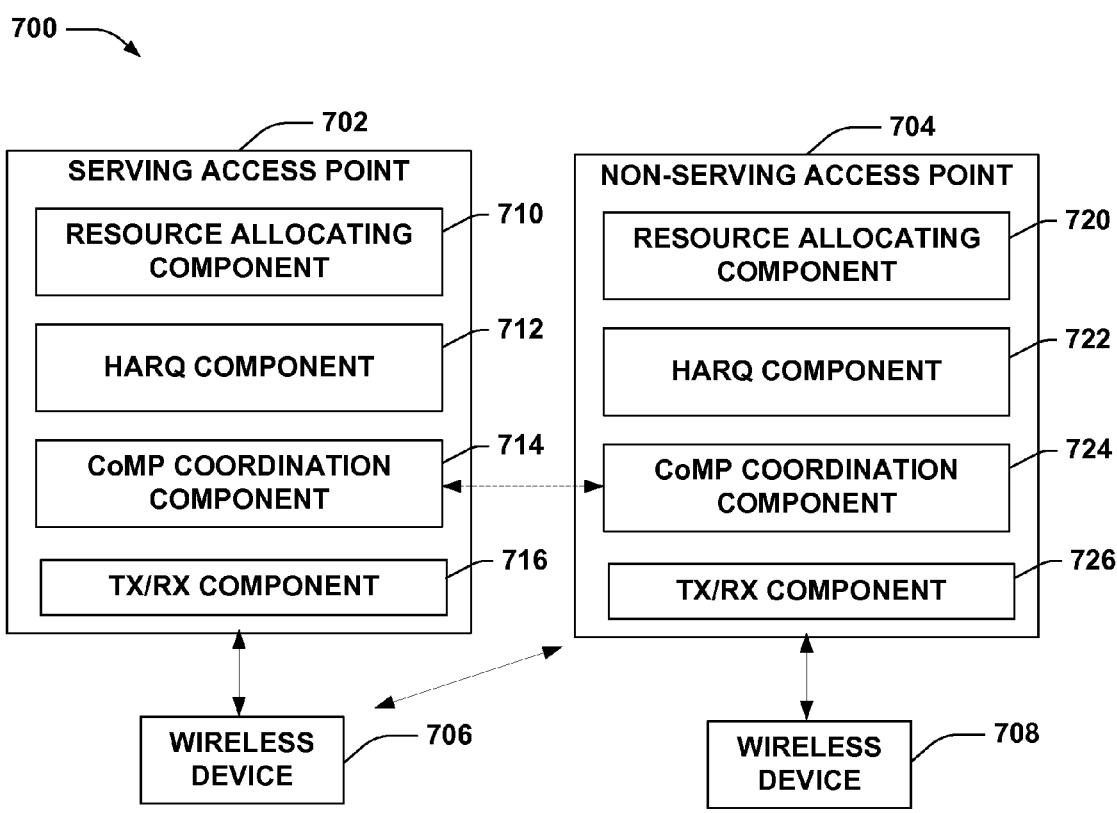
FIG. 7 illustrates an example system that coordinates uplink resource allocation in CoMP communications, in accordance with certain embodiments of the present disclosure.

FIG. 7 illustrates an example system that coordinates uplink resource allocation in CoMP communications, in accordance with certain embodiments of the present disclosure. As illustrated, a serving access point 702 may communicate with a non-serving access point to coordinately transmit data to a wireless device 706. The serving access point 702 may include an uplink resource assignment module 710, a HARQ module 712, a CoMP coordination module 714, and a transmit/receive module 716. The uplink resource assignment module 710 may allocate uplink resources to a UE. The CoMP coordination module 714 may send information about the allocated resources and data to other APs in the CoMP set. The HARQ module is responsible for arranging retransmission of the data in HARQ operation. The transmit/receive module 716 transmits data and control information to the UE and receives ACK/NACK messages from the UE.

The non-serving access point 704 may also have an uplink resource assignment module 720, a HARQ module 722, a CoMP coordination module 724, and a transmit/receive module 726. The uplink resource assignment module 720 in the non-serving access point may clear uplink resources assigned to a UE for CoMP transmission to avoid collisions. For example, the non-serving access point 704 may assign other resources to the wireless device 708 so that transmissions from the wireless devices 706 and 708 do not collide. HARQ operation in the HARQ module 722 may be disabled for the non-serving access point. Therefore, the non-serving access point may treat each CoMP transmission as a one-time event. The CoMP coordination module 724 may receive control and data from the serving access point 702 and may coordinate transmission of the data to the wireless device 706 by the transmit/receive module 726.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by a non-serving access point (AP) of a coordinated multi-point (CoMP) set, comprising:
   receiving, from a serving access point (AP) of the CoMP set, information regarding uplink resources allocated to a first user equipment (UE) for acknowledgement of a joint CoMP transmission sent from a plurality of APs in the CoMP set;
   sending a downlink transmission to the first UE as part of the joint CoMP transmission; and
   taking one or more actions, based on the information received from the serving AP, to reduce interference with the acknowledgement of the joint CoMP transmission from the first UE, wherein the one or more actions include sending downlink transmissions to one or more UEs with hybrid automatic repeat request (HARQ) disabled, and wherein the joint CoMP transmission includes downlink transmissions to the one or more UEs from the serving AP with HARQ enabled.

2. The method of claim 1, wherein the information comprises an indication of physical uplink control channel (PUCCH) resources allocated to the first UE.

3. The method of claim 1, wherein the information is transmitted by the serving AP in a control channel element (CCE) of a physical downlink control channel (PDCCH).

4. The method of claim 1, wherein the information is received through radio resource control (RRC) signaling.

5. The method of claim 1, wherein taking one or more actions comprises:
   avoiding allocation of uplink resources to one or more second UEs that would potentially interfere with the acknowledgement transmitted from the first UE.

6. The method of claim 5, wherein avoiding allocation of uplink resources to one or more second UEs that would potentially interfere with the acknowledgement transmitted from the first UE comprises:
   avoiding allocation of uplink resources to the second UEs for transmitting acknowledgements that overlap with the uplink resources allocated to the first UE for transmitting the acknowledgement.

7. The method of claim 1, further comprising receiving information regarding retransmission of the downlink transmission from the serving AP.

8. A method for wireless communications by a serving access point (AP) of a coordinated multi-point (CoMP) set, comprising:
   transmitting, to a non-serving access point (AP) of the CoMP set, information regarding uplink resources allocated to a user equipment (UE) for acknowledgement of a joint CoMP transmission sent from a plurality of APs in the CoMP set;
   transmitting, to the non-serving AP of the CoMP set, instructions to disable Hybrid Automatic Repeat Request (HARQ) operation for downlink transmissions to the UE from the non-serving AP; and
   transmitting a downlink transmission to the UE as part of the joint CoMP transmission with HARQ operation enabled.

9. The method of claim 8, wherein the information comprises an indication of physical uplink control channel (PUCCH) resources allocated to the UE.

10. The method of claim 8, wherein the information is transmitted in a control channel element (CCE) of a physical downlink control channel (PDCCH).

11. The method of claim 8, wherein the information is transmitted through radio resource control (RRC) signaling.

12. The method of claim 8, further comprising:
   transmitting information regarding retransmission of the downlink transmission to a non-serving AP if an acknowledgement is not received from the UE.

13. An apparatus for wireless communications by a non-serving access point (AP) of a coordinated multi-point (CoMP) set, comprising:
    at least one processor configured to
        receive, from a serving access point (AP) of the CoMP set, information regarding uplink resources allocated to a first user equipment (UE) for acknowledgement of a joint CoMP transmission sent from a plurality of APs in the CoMP set,
        send a downlink transmission to the first UE as part of the joint CoMP transmission, and
        take one or more actions, based on the information received from the serving AP, to reduce interference with the acknowledgement of the joint CoMP transmission from the first UE, wherein the one or more actions include sending downlink transmissions to one or more UEs with hybrid automatic repeat request (HARQ) disabled, and wherein the joint CoMP transmission includes downlink transmissions to the one or more UEs from the serving AP with HARQ enabled; and
    a memory coupled to the at least one processor.

14. The apparatus of claim 13, wherein the information comprises an indication of physical uplink control channel (PUCCH) resources allocated to the first UE.

15. The apparatus of claim 13, wherein the information is transmitted by the serving AP in a control channel element (CCE) of a physical downlink control channel (PDCCH).

16. The apparatus of claim 13, wherein the information is received through radio resource control (RRC) signaling.

17. The apparatus of claim 13, wherein the at least one processor configured to take one or more actions is further configured to:
    avoid allocation of uplink resources to one or more second UEs that would potentially interfere with the acknowledgement transmitted from the first UE.

18. The apparatus of claim 17, wherein the at least one processor configured to avoid allocation of uplink resources to one or more second UEs that would potentially interfere with the acknowledgement transmitted from the first UE is further configured to:
    avoid allocation of uplink resources to the second UEs for transmitting acknowledgements that overlap with the uplink resources allocated to the first UE for transmitting the acknowledgement.

19. The apparatus of claim 13, wherein the at least one processor is further configured to receive information regarding retransmission of the downlink transmission from the serving AP.

20. An apparatus for wireless communications by a serving access point (AP) of a coordinated multi-point (CoMP) set, comprising:
    at least one processor configured to
        transmit, to a non-serving access point (AP) of the CoMP set, information regarding uplink resources allocated to a user equipment (UE) for acknowledgement of a joint CoMP transmission sent from a plurality of APs in the CoMP set,
        transmit, to the non-serving AP of the CoMP set, instructions to disable Hybrid Automatic Repeat Request (HARQ) operation for downlink transmissions to the UE from the non-serving AP, and
        transmit a downlink transmission to the UE as part of the joint CoMP transmission with HARQ operation enabled; and
    a memory coupled to the at least one processor.

21. The apparatus of claim 20, wherein the information comprises an indication of physical uplink control channel (PUCCH) resources allocated to the UE.

22. The apparatus of claim 20, wherein the information is transmitted in a control channel element (CCE) of a physical downlink control channel (PDCCH).

23. The apparatus of claim 20, wherein the information is transmitted through radio resource control (RRC) signaling.

24. The apparatus of claim 20, wherein the at least one processor is further configured to transmit information regarding retransmission of the downlink transmission to a non-serving AP if an acknowledgement is not received from the UE.

25. An apparatus for wireless communications by a non-serving access point (AP) of a coordinated multi-point (CoMP) set, comprising:
    means for receiving, from a serving access point (AP) of the CoMP set, information regarding uplink resources allocated to a first user equipment (UE) for acknowledgement of a joint CoMP transmission sent from a plurality of APs in the CoMP set;
    means for sending a downlink transmission to the first UE as part of the joint CoMP transmission; and
    means for taking one or more actions, based on the information received from the serving AP, to reduce interference with the acknowledgement of the joint CoMP transmission from the first UE, wherein the means for taking one or more actions includes means for sending downlink transmissions to one or more UEs with hybrid automatic repeat request (HARQ) disabled, and wherein the joint CoMP transmission includes downlink transmissions to the one or more UEs from the serving AP with HARQ enabled.

26. The apparatus of claim 25, wherein the information comprises an indication of physical uplink control channel (PUCCH) resources allocated to the first UE.

27. The apparatus of claim 25, wherein the information is transmitted by the serving AP in a control channel element (CCE) of a physical downlink control channel (PDCCH).

28. The apparatus of claim 25, wherein the information is received through radio resource control (RRC) signaling.

29. The apparatus of claim 25, wherein the means for taking one or more actions comprises:
    means for avoiding allocation of uplink resources to one or more second UEs that would potentially interfere with the acknowledgement transmitted from the first UE.

30. The apparatus of claim 29, wherein the means for avoiding allocation of uplink resources to one or more second UEs that would potentially interfere with the acknowledgement transmitted from the first UE comprises:
    means for avoiding allocation of uplink resources to the second UEs for transmitting acknowledgements that overlap with the uplink resources allocated to the first UE for transmitting the acknowledgement.

31. The apparatus of claim 25, further comprising:
    means for receiving information regarding retransmission of the downlink transmission from the serving AP.

32. An apparatus for wireless communications by a serving access point (AP) of a coordinated multi-point (CoMP) set, comprising:
    means for transmitting, to a non-serving access point (AP) of the CoMP set, information regarding uplink resources allocated to a user equipment (UE) for acknowledgement of a joint CoMP transmission sent from a plurality of APs in the CoMP set;
    means for transmitting, to the non-serving AP of the CoMP set, instructions to disable Hybrid Automatic Repeat Request (HARQ) operation for downlink transmissions to the UE from the non-serving AP; and means for transmitting a downlink transmission to the UE as part of the joint CoMP transmission with HARQ operation enabled.

33. The apparatus of claim 32, wherein the information comprises an indication of physical uplink control channel (PUCCH) resources allocated to the UE.

34. The apparatus of claim 32, wherein the information is transmitted in a control channel element (CCE) of a physical downlink control channel (PDCCH).

35. The apparatus of claim 32, wherein the information is transmitted through radio resource control (RRC) signaling.

36. The apparatus of claim 32, further comprising:
means for transmitting information regarding retransmission of the downlink transmission to a non-serving AP if an acknowledgement is not received from the UE.

37. A computer-program product for wireless communications by a non-serving access point (AP) of a coordinated multi-point (CoMP) set, comprising a non-transitory computer readable medium having instructions stored thereon, the instructions being executable by one or more processors and the instructions comprising:
instructions for receiving, from a serving access point (AP) of the CoMP set, information regarding uplink resources allocated to a first user equipment (UE) for acknowledgement of a joint CoMP transmission sent from a plurality of APs in the CoMP set;
instructions for sending a downlink transmission to the first UE as part of the joint CoMP transmission; and
instructions for taking one or more actions, based on the information received from the serving AP, to reduce interference with the acknowledgement of the joint CoMP transmission from the first UE, wherein the instructions for taking one or more actions includes instructions for sending downlink transmissions to one or more UEs with hybrid automatic repeat request (HARQ) disabled, and wherein the joint CoMP transmission includes downlink transmissions to the one or more UEs from the serving AP with HARQ enabled.

38. The apparatus of claim 37, wherein the information comprises an indication of physical uplink control channel (PUCCH) resources allocated to the first UE.

39. The apparatus of claim 37, wherein the information is transmitted by the serving AP in a control channel element (CCE) of a physical downlink control channel (PDCCH).

40. The apparatus of claim 37, wherein the information is received through radio resource control (RRC) signaling.

41. The apparatus of claim 37, wherein the instructions for taking one or more actions comprise:
instructions for avoiding allocation of uplink resources to one or more second UEs that would potentially interfere with the acknowledgement transmitted from the first UE.

42. The apparatus of claim 41, wherein the instructions for avoiding allocation of uplink resources to one or more second UEs that would potentially interfere with the acknowledgement transmitted from the first UE comprise:
instructions for avoiding allocation of uplink resources to the second UEs for transmitting acknowledgements that overlap with the uplink resources allocated to the first UE for transmitting the acknowledgement.

43. The apparatus of claim 37, further comprising: instructions for receiving information regarding retransmission of the downlink transmission from the serving AP.

44. A computer-program product for wireless communications by a serving access point (AP) of a coordinated multi-point (CoMP) set, comprising a non-transitory computer readable medium having instructions stored thereon, the instructions being executable by one or more processors and the instructions comprising:
instructions for transmitting, to a non-serving access point (AP) of the CoMP set, information regarding uplink resources allocated to a user equipment (UE) for acknowledgement of a joint CoMP transmission sent from a plurality of APs in the CoMP set;
instructions for transmitting, to the non-serving AP of the CoMP set, instructions to disable Hybrid Automatic Repeat Request (HARQ) operation for downlink transmissions to the UE from the non-serving AP, and
instructions for transmitting a downlink transmission to the UE as part of the joint CoMP transmission with HARQ operation enabled.

45. The apparatus of claim 44, wherein the information comprises an indication of physical uplink control channel (PUCCH) resources allocated to the UE.

46. The apparatus of claim 44, wherein the information is transmitted in a control channel element (CCE) of a physical downlink control channel (PDCCH).

47. The apparatus of claim 44, wherein the information is transmitted through radio resource control (RRC) signaling.

48. The apparatus of claim 44, further comprising:
instructions for transmitting information regarding retransmission of the downlink transmission to a non-serving AP if an acknowledgement is not received from the UE.

* * * * *